United States Patent [19]

Damratowski

[11] 4,456,396
[45] Jun. 26, 1984

[54] COUPLING AND METHOD OF ASSEMBLY AND DISASSEMBLY

[75] Inventor: Leonard P. Damratowski, Monroeville, Pa.

[73] Assignee: Elliott Turbomachinery Company, Inc., Jeannette, Pa.

[21] Appl. No.: 337,233

[22] Filed: Jan. 6, 1982

[51] Int. Cl.³ .............................................. F16L 17/00
[52] U.S. Cl. ........................................ 403/15; 403/34; 29/252
[58] Field of Search ................... 29/252, 282; 403/15, 403/34; 81/57.38; 254/29 A

[56] References Cited

U.S. PATENT DOCUMENTS

| Re. 29,968 | 4/1979 | Geese et al. | 403/15 |
|---|---|---|---|
| 1,959,901 | 5/1934 | Buehle | 403/15 |
| 2,926,940 | 3/1960 | Maass | 29/252 X |
| 3,033,597 | 5/1962 | Miller | 403/15 |
| 3,104,459 | 9/1963 | Wendt | 29/252 |
| 3,228,102 | 1/1966 | Sillett | 29/252 |
| 3,751,124 | 8/1973 | Hanson et al. | 308/194 |
| 3,795,294 | 3/1974 | Pearson | 192/85 AT |
| 3,865,497 | 2/1975 | Bratt et al. | 403/15 |
| 4,375,926 | 3/1983 | Feller | 403/15 |

FOREIGN PATENT DOCUMENTS

| 2014425 | 4/1970 | France . |
|---|---|---|
| 2228978 | 5/1974 | France . |
| A5567191 | 8/1975 | Switzerland . |

Primary Examiner—Frederick R. Schmidt
Assistant Examiner—Steven P. Schad
Attorney, Agent, or Firm—Robert P. Hayter

[57] ABSTRACT

A hub is mounted or dismounted by the use of hydraulic pressure with the hub being the only movable member. Either of two seals of different diameters are used in conjunction with a third seal of an intermediate diameter so as to establish a differential annular area between the two seals in use. Depending upon which pair of seals is used, hydraulic pressure tends to either force the hub onto or off of the shaft.

5 Claims, 4 Drawing Figures

COUPLING AND METHOD OF ASSEMBLY AND DISASSEMBLY

BACKGROUND OF THE INVENTION

The present invention is directed to a shaft coupling, with or without a key, which may be mounted or removed through the use of hydraulic pressure.

In the rotary machine art, it is common practice to move the hub of a coupling, impeller or the like onto a shaft over which the hub has been preliminarily applied or to displace a hub from such a mounted position. Such couplings use a number of parts which can be combined in different arrangements for mounting and dismounting the hub.

SUMMARY OF THE INVENTION

According to the present invention, a hub is moved into or out of a force-fit on a shaft by hydraulic pressure. Either of two annular seals of different diameters are used to establish a seal between the hub and a lock nut. A third annular seal of an intermediate diameter is used to establish a seal between the hub and the shaft and together with either one of the two annular seals between the hub and the lock nut defines an annular chamber for receiving pressurized hydraulic fluid. A differential area is established on the hub which, depending upon which of the two seals is used, tends to move the hub onto or off the shaft responsive to hydraulic pressure acting on the differential area.

It is an object of this invention to provide a method and apparatus for moving the hub of a coupling, wheel, propeller, impeller or the like into and out of a force-fit position on a shaft to which the hub may be keyed.

It is a further object of this invention to provide a simplified mounting and removal of a hub for a shaft of a rotary machine.

It is an additional object of this invention to provide a mechanism for mounting and removing a hub wherein the hub is the only movable member. These objects, and others as will become apparent hereinafter, are accomplished by the present invention.

Basically, either of two seals of different diameters, depending upon the step to be taken, is placed between the hub to be moved and the lock nut which is threaded to the shaft and thereby integral therewith. Each of these seals defines a differential area on the hub relative to a seal of an intermediate diameter located between the hub and the shaft. Thus, depending upon which of the two seals is in place, hydraulic pressure supplied to the cavity formed between the shaft and the hub will act on the hub to tend to move the hub onto or off of the shaft. If desired, a key may be used between the hub and the shaft.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
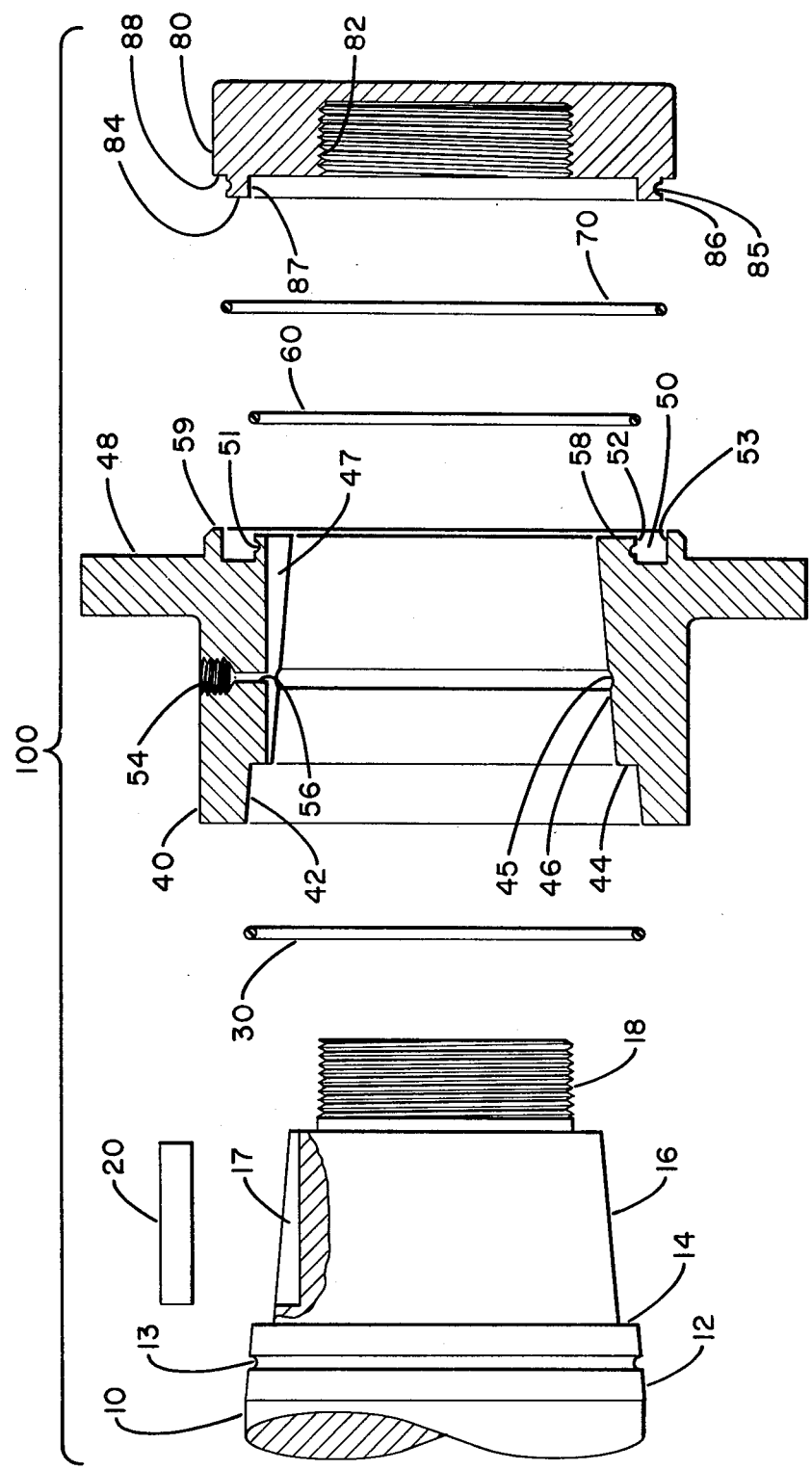
FIG. 1 is an exploded sectional view of a coupling.

As best shown in FIG. 1, the coupling 100 is made up of shaft 10, key 20, seal 30, hub 40, seals 60 and 70 and lock nut 80. Shaft 10 has a first tapered portion 12 with a groove 13 therein for receiving seal 30, a step portion 14, a second tapered portion 16 having a keyway 17 therein for receiving key 20, and a threaded portion 18. Hub 40 is bored complementarily to shaft 10 and has a first tapered bore section 42, a hub step 44 and a second tapered bore section 46 having an annular groove 45 and a keyway 47 for receiving key 20. While hub 40 can be the hub of a wheel, impeller or the like, it is illustrated as a coupling having a flange 48 which is adapted to be secured to a similar coupling affixed to a second shaft to thereby establish a string. An annular recess 50 is formed in one end of hub 40 and has a groove 51 in inner annular surface 52 for receiving seal 60. Tapped hole 54 and drilled passageway 56 form a fluid path through the wall of hub 40 terminating in annular groove 45 and bore 46. Lock nut 80 has a threaded bore portion 82 for sealingly engaging threaded portion 18 of shaft 10 and has an annular projection 84 which is adapted to be received in complementary annular recess 50 of hub 40. A groove 85 for receiving seal 70 is formed on outer surface 86 of projection 84. If desired a second annular projection can be formed on lock nut 80 to limit the axial movement of key 20.

Figure 2:
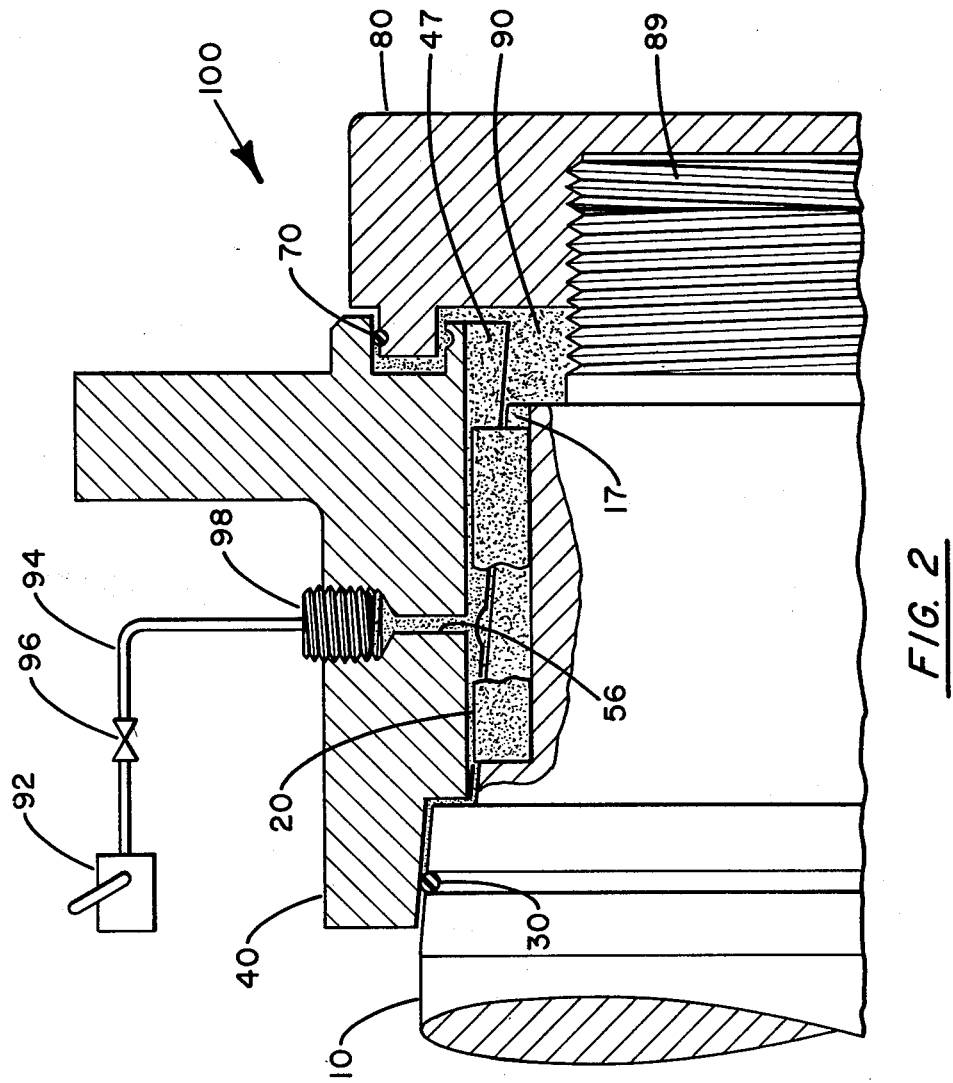
FIG. 2 is a partial sectional view showing the assembly arrangement of the coupling.
Figure 3:
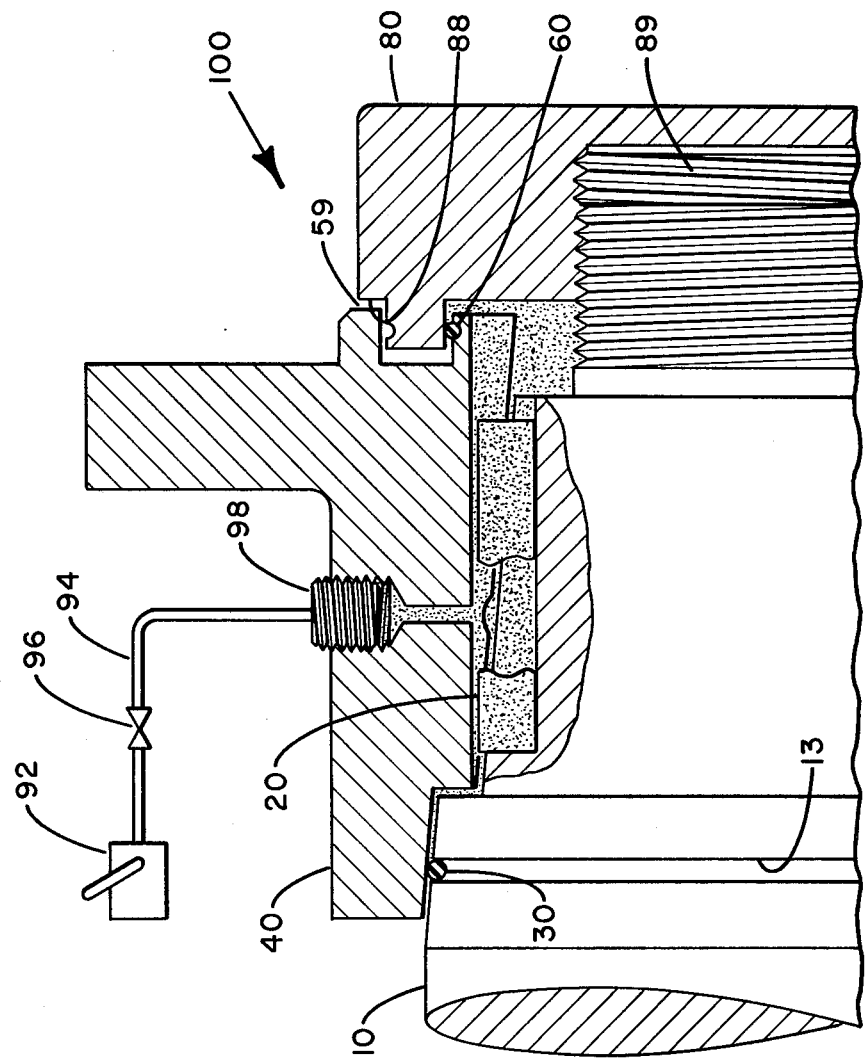
FIG. 3 is a partial sectional view showing the disassembly arrangement of the coupling.

The assembled coupling 100 is illustrated in the assembly arrangement in FIG. 2 and in the disassembly arrangement in FIG. 3. The only structural differences in these two Figures is the use of seal 70 in the FIG. 2 arrangement and the use of seal 60 in the FIG. 3 arrangement. Because hub 40 is the only moving part, fluid pressure supplied to the annular cavity 90 formed between shaft 10, hub 40 and lock nut 80 acts on the differential area defined by the annular area between seal 30 and seal 70 for the assembly arrangement of FIG. 2 and the annular area between seal 30 and seal 60 for the disassembly arrangement of FIG. 3 to tend to move hub 40.

Referring now to FIG. 2, hub 40 is placed over shaft 10 with key 20 in place in keyway 17 and keyway 47 aligned therewith to prevent relative rotational movement of hub 40 and shaft 10 in the event that design torque is exceeded. Alternatively, key 20 can be inserted after hub 40 is placed over shaft 10. Hub 40 is slid onto shaft 10 so that seal 30 sealingly engages tapered bore 42. Seal 70 is placed in groove 85 and lock nut 80 is threaded onto threaded portion 18 of shaft 10 so that annular projection 84 enters into recess 50 and seal 70 sealingly engages surface 53 of annular recess 50. Threaded portion 18 of the shaft 10 and threaded bore portion 82 of lock nut 80 provide at least a nominal sealing structure. However since bore portion 82 does not go through lock nut 80, an oil collecting cavity 89 is formed between the shaft 10 and lock nut 80 to prevent the leakage of oil to atmosphere, and the loss of hydraulic pressure. Pump 92 is serially connected to cavity 90 via line 94, valve 96, fluid tight connection 98, passage 56 and annular groove 45. Fluid pressure, which is indicated by stippling, is supplied by pump 92 via groove 45 to cavity 90 and acts on a differential area defined on hub 40 by $$\pi(D_1^2 - D_2^2)/4$$

where $D_1$ is the diameter of seal 70 and $D_2$ is the diameter of seal 30. The force acting on hub 40 to force-fit it on shaft 10 is $P\pi(D_1^2-D_2^2)/4$ where P is the fluid pressure. The fluid pressure acting radially on hub 40 tends to increase the inner diameter of all portions of the hub 40 exposed to the fluid pressure. Similarly, fluid pressure acting radially on shaft 10 tends to reduce the diameter of the portion of the shaft exposed to fluid pressure. The net result of the fluid pressure acting on the members causes hub 40 to move further onto shaft 10. Upon the removal of the fluid pressure, a force-fit will be established between tapered portion 12 and tapered bore 42 as well as between tapered portion 16 and tapered bore 46. Step portions 14 and 44 can remain separated as will end 58 of the hub and lock nut 80 as a function of the desired hub interference with the shaft after the hydraulic pressure is removed. The axial position of the hub relative to the shaft determines the final interference fit. This can be measured in a conventional manner or a reference can be provided as in the FIG. 4 configuration. Lock nut 80 would then be tightened until surfaces 59 and 88 engage so as to prevent movement of the hub 40.

Referring now to FIG. 3, lock nut 80 is removed from shaft 10 and seal 60 is placed in groove 51 of hub 40. Seal 70 is preferably removed from groove 85 but may be left in place since its sealing function is obviated by the presence of seal 60. Lock nut 80 is threaded onto threaded portion 18 of shaft 10 so that annular projection 84 enters into recess 50 and seal 60 sealingly engages surface 87 of annular projection 84. Surfaces 59 and 88 are spaced so that hub 40 can be moved by the fluid pressure and the movement measured and/or detected. As in the FIG. 2 arrangement, fluid pressure, indicated by stippling, is supplied by pump 92 via groove 45 to cavity 90 and acts on a differential area which is now defined on hub 40 by $$\pi(D_2^2-D_3^2)/4$$

where $D_3$ is the diameter of seal 60. The force acting on hub 40 to remove hub 40 from shaft 10 is $P\pi(D_2^2-D_3^2)/4$. As explained above, fluid pressure also acts radially to separate the members. If the members are initially in a fluid-tight interference fit, pressure supplied to annular groove 45 progressively spreads the hub 40 and shaft 10 until fluid communication is established with cavity 90. The net result is that fluid pressure acting on the differential area of hub 40 causes hub 40 to tend to move off of shaft 10. Disassembly movement is limited by the engaging of surface 59 of hub 40 with surface 88 of lock nut 80. In this position, however, there is no longer a force-fit between the hub 40 and shaft 10 so that hub 40 can be easily removed.

Figure 4:
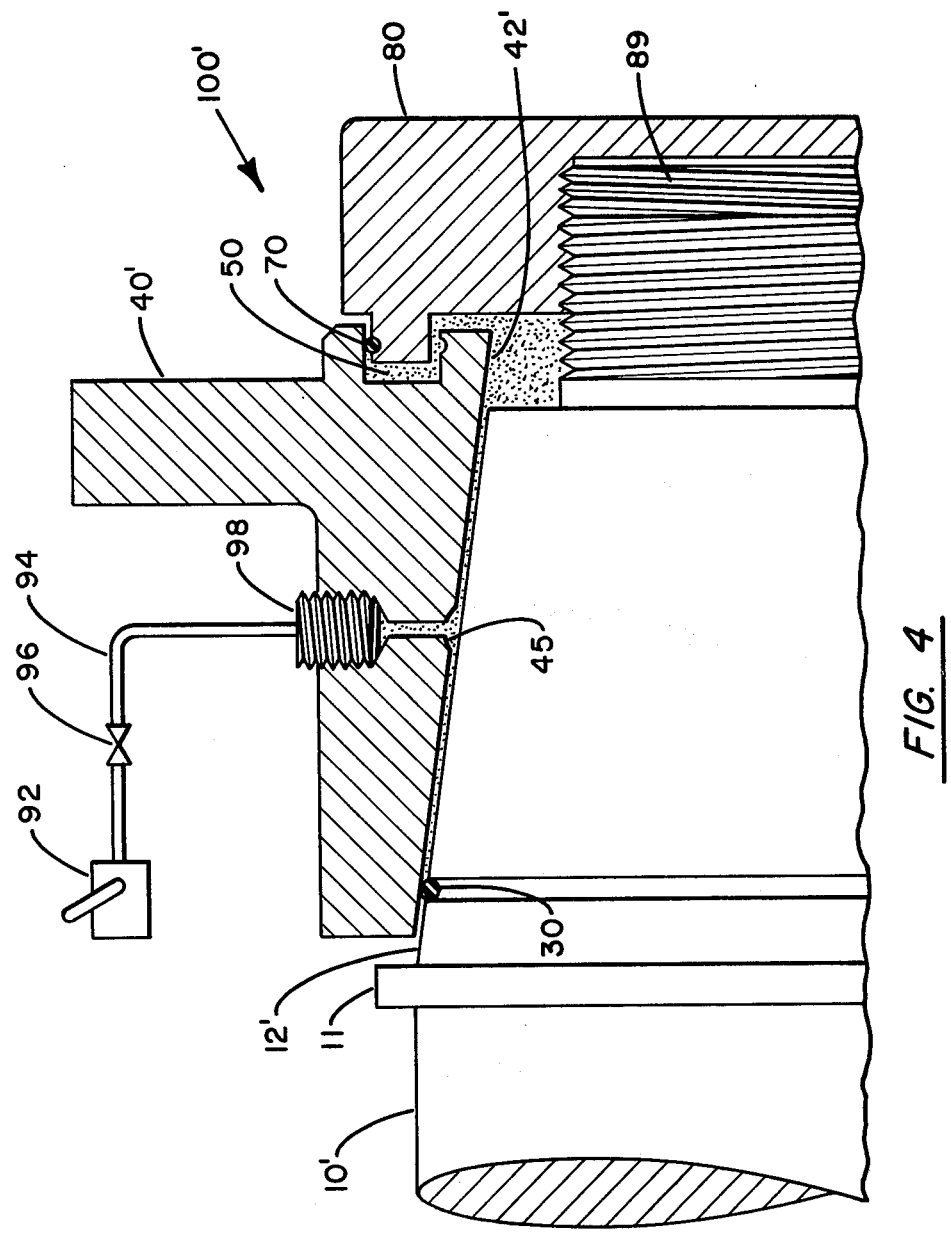
FIG. 4 is a partial sectional view of a modified coupling in the assembly arrangement.

The coupling 100 may be modified by eliminating the key 20 and related structure. The resultant coupling 100' is illustrated in FIG. 4 where all modified structure is indicated by a prime. Coupling 100' is the same as coupling 100 except that key 20, keyway 47 and steps 14 and 44 have been eliminated. Additionally, tapered shaft portions 12 and 16 of shaft 10' have been replaced with a single, steeper sloped shaft portion 12' and tapered bore portions 42 and 46 of hub 40' have been replaced with a single steeper sloped bore 42' complementary to tapered portion 12'. Annular flange 11 has been added to shaft 10' to provide a reference point for determining the interference fit of hub 40' on shaft 10'. Except for the key and its function, coupling 100' would be assembled and disassembled the same as coupling 100. Although preferred embodiments of the present invention have been illustrated and described, other changes will occur to those skilled in the art. For example, the bores may be made cylindrical rather than tapered. It is therefore intended that the scope of the present invention is to be limited only by the scope of the appended claims.

What is claimed is:

1. An assembly for mounting a hub on a shaft and the removal thereof comprising:

shaft means;

hub means adapted to be mounted on said shaft means in a force-fit;

lock nut means adapted to be threadably secured to said shaft means so as to be integral therewith and defining together with said shaft means and said hub means an annular chamber;

first seal means of a first diameter for sealing between said shaft means and said hub means at said first diameter;

second seal means of a second diameter which is larger than said first diameter for sealing between said lock nut means and said hub means at said second diameter;

third seal means of a third diameter which is smaller than said first diameter for sealing between said lock nut means and said hub means at said third diameter;

means for providing a fluid path to said annular chamber;

whereby if said first and second seal means are in place to establish a first differential area on said hub means and fluid pressure is supplied to said fluid path, said hub means will be pushed onto said shaft means, and if said first and third seal means are in place to establish a second differential area on said hub means and fluid pressure is supplied to said fluid path, said hub means will be pushed off of said shaft means.

2. An assembly for mounting a hub on a shaft and the removal thereof comprising:

(I) a shaft serially including:

(1) a first tapered portion having an annular seal groove therein at a first diameter;

(2) a second tapered portion having a keyway therein and being of a lesser diametrical extent than said first tapered portion;

(3) a threaded portion;

(II) a hub having a bore therein adapted to be placed on said shaft in a force-fit including:

(1) a step portion in said bore defining a portion of a first fluid pressure responsive area;

(2) a first tapered bore portion extending from one end of said hub to said step portion and being complementary to said first tapered portion of said shaft;

(3) a second tapered bore portion extending from said step portion to a second end of said hub and being complementary to said second tapered portion of said shaft and having a keyway therein;

(4) fluid path means communicating with said second tapered bore portion of said hub;

(5) an annular recess formed in said second end of said hub and having a first cylindrical surface of lesser diametrical extent than said annular seal groove in said shaft and a second cylindrical surface of greater diametrical extent than said annular seal groove in said shaft;

(III) a key adapted to be received in said keyways so as to prevent relative rotational movement between said hub and said shaft;

(IV) a lock nut including:
(1) a threaded portion adapted to threadably engage said threaded portion of said shaft;
(2) an annular projection having first and second cylindrical surfaces corresponding to said respective first and second cylindrical surfaces of said annular recess whereby said annular projection is adapted to be received in said annular recess;

(V) a first seal adapted to be received in said annular seal groove in said shaft and to form a fluid seal between said hub and said shaft;

(VI) a second seal adapted to form a fluid seal between said second cylindrical surfaces of said annular recess and said annular projection;

(VII) a third seal adapted to form a fluid seal between said first cylindrical surfaces of said annular recess and said annular projection:
whereby if said first and second seals are in place and fluid pressure is supplied to said fluid path means, said hub will be pushed onto said shaft, and, if said first and third seals are in place and fluid pressure is supplied to said fluid path means, said hub will be pushed off of said shaft.

3. The assembly of claim 1 further including an annular groove in said second tapered bore portion of said hub which is in fluid communication with said fluid path means.

4. The assembly of claim 1 wherein said threaded portion of said lock nut and said threaded portion of said shaft coact to define an oil collecting cavity.

5. A method for mounting a hub on a shaft and removing it therefrom comprising the steps of:
placing a hub onto a shaft and providing a seal therebetween at a first diameter;
threadably securing a lock nut to the shaft and providing a seal between the hub and the lock nut at a second diameter which is greater than the first diameter;
supplying fluid pressure to an annular chamber formed by the hub, shaft and lock nut whereby the fluid pressure acts on a first differential area on the hub between the first and second diameters and causes the hub to move on the shaft in a force-fit;
removing the lock nut from the shaft and the seal between the hub and the lock nut;
securing the lock nut to the shaft and providing a seal between the hub and the lock nut at a third diameter which is smaller than the first diameter; and
supplying fluid pressure to the annular chamber whereby the fluid pressure acts on a second differential area between the first and third diameters and causes the hub to be pushed off of the shaft.

* * * * *